(12) United States Patent
Haverinen et al.

(10) Patent No.: US 9,933,508 B2
(45) Date of Patent: Apr. 3, 2018

(54) MAGNETIC POSITIONING MANAGEMENT

(71) Applicant: INDOORATLAS OY, Oulu (FI)

(72) Inventors: Janne Haverinen, Kiviniemi (FI); Esa Rahtu, Oulu (FI); Juho Kannala, Oulu (FI)

(73) Assignee: INDOORATLAS OY, Oulu (FI)

( * ) Notice: Subject to any disclaimer, the term of this patent is extended or adjusted under 35 U.S.C. 154(b) by 167 days.

(21) Appl. No.: 14/859,985

(22) Filed: Sep. 21, 2015

(65) Prior Publication Data

US 2017/0082725 A1    Mar. 23, 2017

(51) Int. Cl.
| | |
|---|---|
| H04W 24/00 | (2009.01) |
| G01S 5/02 | (2010.01) |
| H04W 4/02 | (2018.01) |
| H04W 4/00 | (2018.01) |
| G01C 21/08 | (2006.01) |

(52) U.S. Cl.
CPC ............ G01S 5/0257 (2013.01); G01C 21/08 (2013.01); G01S 5/0252 (2013.01); G01S 5/0284 (2013.01); H04W 4/008 (2013.01); H04W 4/023 (2013.01); H04W 4/025 (2013.01)

(58) Field of Classification Search
CPC .......................................... H04W 4/023–4/027
USPC ............................................. 455/456.1–456.6
See application file for complete search history.

(56) References Cited

U.S. PATENT DOCUMENTS

| | | | |
|---|---|---|---|
| 8,798,924 B2 | 8/2014 | Haverinen | |
| 9,078,104 B2 | 7/2015 | Haverinen | |
| 9,080,874 B2 | 7/2015 | Haverinen | |
| 2005/0136845 A1* | 6/2005 | Masuoka | G01S 5/0294 455/67.14 |
| 2013/0179074 A1* | 7/2013 | Haverinen | G01C 21/08 701/525 |
| 2013/0179075 A1 | 7/2013 | Haverinen | |
| 2013/0295957 A1 | 11/2013 | Haverinen | |
| 2014/0286534 A1 | 9/2014 | Haverinen | |
| 2014/0320121 A1 | 10/2014 | Perttunen et al. | |
| 2014/0357305 A1 | 12/2014 | Haverinen et al. | |
| 2014/0365119 A1 | 12/2014 | Haverinen et al. | |

(Continued)

FOREIGN PATENT DOCUMENTS

EP    2 889 578 A1    7/2015

OTHER PUBLICATIONS

Jan. 3, 2017 International Search Report issued in International Patent Application No. PCT/FI2016/050650.

(Continued)

*Primary Examiner* — Joshua Schwartz
(74) *Attorney, Agent, or Firm* — Oliff PLC

(57) ABSTRACT

Apparatus, method and computer program for magnetic positioning management. A management apparatus assigns an identifier for a transmitting mobile apparatus, and commands the transmitting mobile apparatus to transmit a radio beacon including the identifier. The management apparatus receives reception information from a receiving mobile apparatus that received the radio beacon, the reception information including the identifier of the transmitting mobile apparatus. For at least one of the transmitting mobile apparatus or the receiving mobile apparatus, the management apparatus determines its estimated location for a magnetic positioning based on an association of the transmitting mobile apparatus with the receiving mobile apparatus.

21 Claims, 13 Drawing Sheets

(56) References Cited

U.S. PATENT DOCUMENTS

| | | |
|---|---|---|
| 2015/0018018 A1 | 1/2015 | Shen et al. |
| 2015/0106373 A1 | 4/2015 | Haverinen et al. |
| 2015/0106403 A1 | 4/2015 | Haverinen et al. |
| 2015/0141050 A1 | 5/2015 | Haverinen |
| 2015/0260523 A1 | 9/2015 | Haverinen |
| 2015/0260524 A1 | 9/2015 | Haverinen |
| 2015/0260543 A1 | 9/2015 | Rantalankila et al. |
| 2016/0012410 A1* | 1/2016 | Hanson ............... G06Q 30/016 705/35 |

OTHER PUBLICATIONS

U.S. Appl. No. 14/524,420 filed in the name of Janne Haverinen.
U.S. Appl. No. 14/626,217 filed in the name of Janne Haverinen.

\* cited by examiner

MAGNETIC POSITIONING MANAGEMENT

FIELD

The invention relates to a magnetic positioning management apparatus, a non-transitory computer-readable storage medium comprising a computer program, and a method in a magnetic positioning management apparatus.

BACKGROUND

Magnetic positioning is currently emerging into the market. However, further refinement is desirable for smooth operation of the magnetic positioning.

BRIEF DESCRIPTION

The present invention seeks to provide an improved magnetic positioning management apparatus, an improved computer program, and an improved method.

According to an aspect of the present invention, there is provided a magnetic positioning management apparatus comprising: one or more processors; and one or more memories including computer program code, the one or more memories and the computer program code configured to, with the one or more processors, cause the magnetic positioning management apparatus at least to: assign an identifier for a transmitting mobile apparatus; command the transmitting mobile apparatus to transmit a radio beacon including the identifier; receive reception information from a receiving mobile apparatus that received the radio beacon, the reception information including the identifier of the transmitting mobile apparatus; and for at least one of the transmitting mobile apparatus or the receiving mobile apparatus, determine its estimated location for a magnetic positioning based on an association of the transmitting mobile apparatus with the receiving mobile apparatus.

According to another aspect of the present invention, there is provided a non-transitory computer-readable storage medium comprising a computer program comprising computer program code which, when loaded into a magnetic positioning management apparatus causes the magnetic positioning management apparatus at least to: assign an identifier for a transmitting mobile apparatus; command the transmitting mobile apparatus to transmit a radio beacon including the identifier; receive reception information from a receiving mobile apparatus that received the radio beacon, the reception information including the identifier of the transmitting mobile apparatus; and for at least one of the transmitting mobile apparatus or the receiving mobile apparatus, determine its estimated location for a magnetic positioning based on an association of the transmitting mobile apparatus with the receiving mobile apparatus.

According to another aspect of the present invention, there is provided a method in a magnetic positioning management apparatus comprising: assigning an identifier for a transmitting mobile apparatus; commanding the transmitting mobile apparatus to transmit a radio beacon including the identifier; receiving reception information from a receiving mobile apparatus that received the radio beacon, the reception information including the identifier of the transmitting mobile apparatus; and for at least one of the transmitting mobile apparatus or the receiving mobile apparatus, determining its estimated location for a magnetic positioning based on an association of the transmitting mobile apparatus with the receiving mobile apparatus.

LIST OF DRAWINGS

Example embodiments of the present invention are described below, by way of example only, with reference to the accompanying drawings, in which FIG. 1 illustrates example embodiments of a magnetic positioning management apparatus and its general operating environment;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the mobile apparatuses have been depicted as separate single entities, different parts may be implemented in one or more physical or logical entities.

Figure 1:
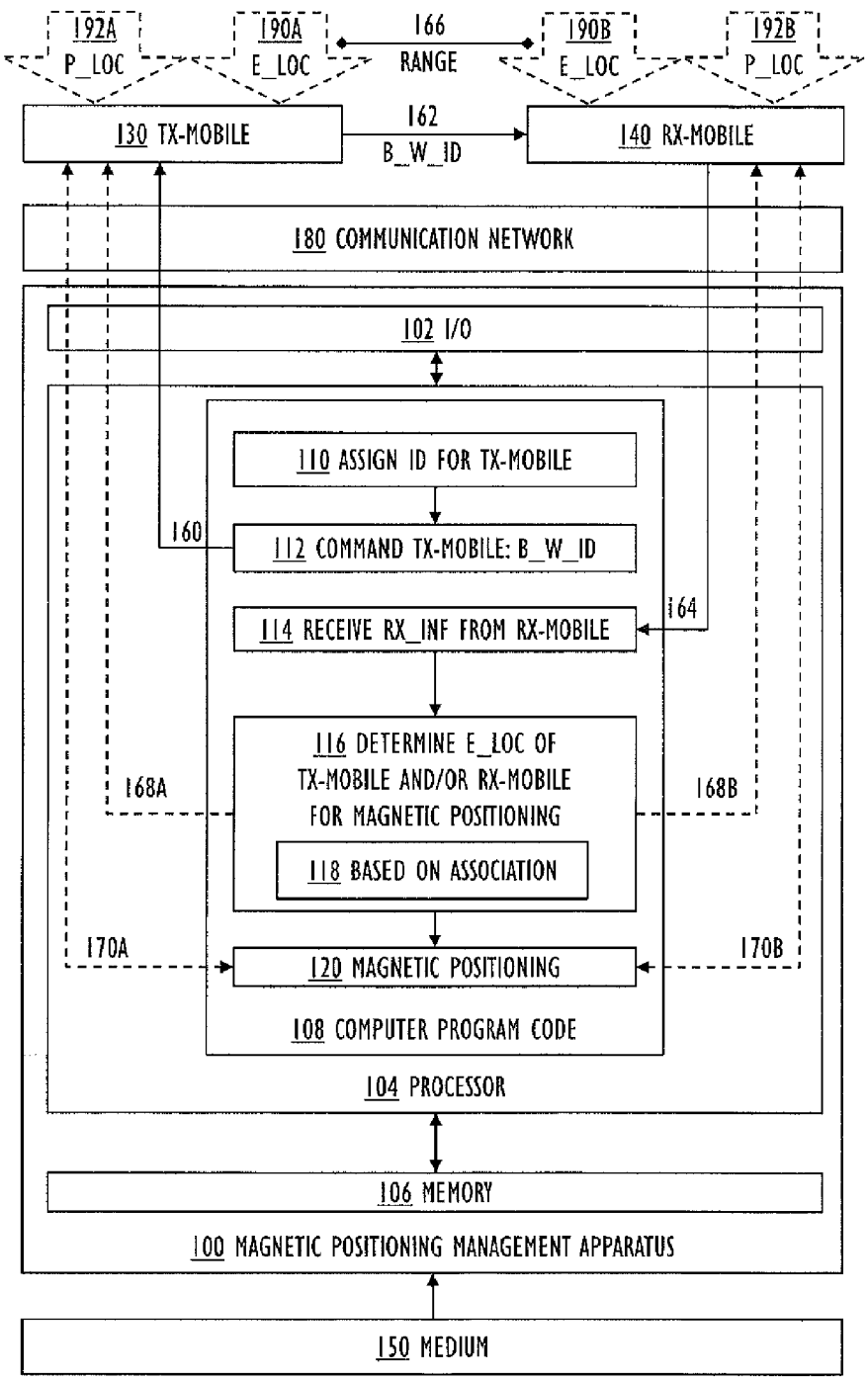

FIG. 1 illustrates example embodiments of a magnetic positioning management apparatus 100 and its general operating environment. The Applicant, IndoorAtlas, has developed many improvements for the magnetic positioning, disclosed in its various patents/applications, incorporated herein by reference: U.S. Pat. No. 8,798,924, Ser. Nos. 13/733,439, 14/299,582, 13/927,854, 14/725,452, 14/725,521 13/859,944, 14/606,358, 13/739,640, 13/871,612, 13/905,655, 13/915,016, 14/054,264, 14/093,250, 14/207,916, 14/524,420, and 14/626,217.

The magnetic positioning management apparatus 100 may comprise an input/output 102 (such as a data communication interface, for example a network interface card) to communicate with mobile apparatuses 130, 140 through a communication network 180.

In an example embodiment, the magnetic positioning management apparatus 100 may be implemented by a suitable computing resource or a combination of various computing resources.

In an example embodiment, the magnetic positioning management apparatus 100 may be implemented as a single server computer or as a cluster of computers. The server is a part of the client-server computing model that acts as distributed application which partitions tasks or workloads between the provider of a resource or service, called server, and the service requester, called client. The server 100 may serve a number of mobile apparatuses 130, 140. The server computer 100 may be a host that is running one or more server programs which share their resources with clients 130, 140. The client 130, 140 may request a service function relating to the magnetic positioning from the server 100. Also, the client 130, 140 may initiate a communication session with the server 100 which awaits incoming requests.

In an example embodiment, the magnetic positioning management apparatus 100 may also operate according to the cloud computing model, at least in part. Naturally, besides these example embodiments of the magnetic positioning management apparatus 100, other feasible computing architectures may be utilized as well to implement the hardware and software of the magnetic positioning management apparatus 100. Consequently, besides operating according to the client/server architecture, push technology may be utilized as well. In push technology, the request for a transaction is initiated by the magnetic positioning management apparatus 100, whereas with the pull technology the request for the information is initiated by the client 130, 140.

Figure 2:
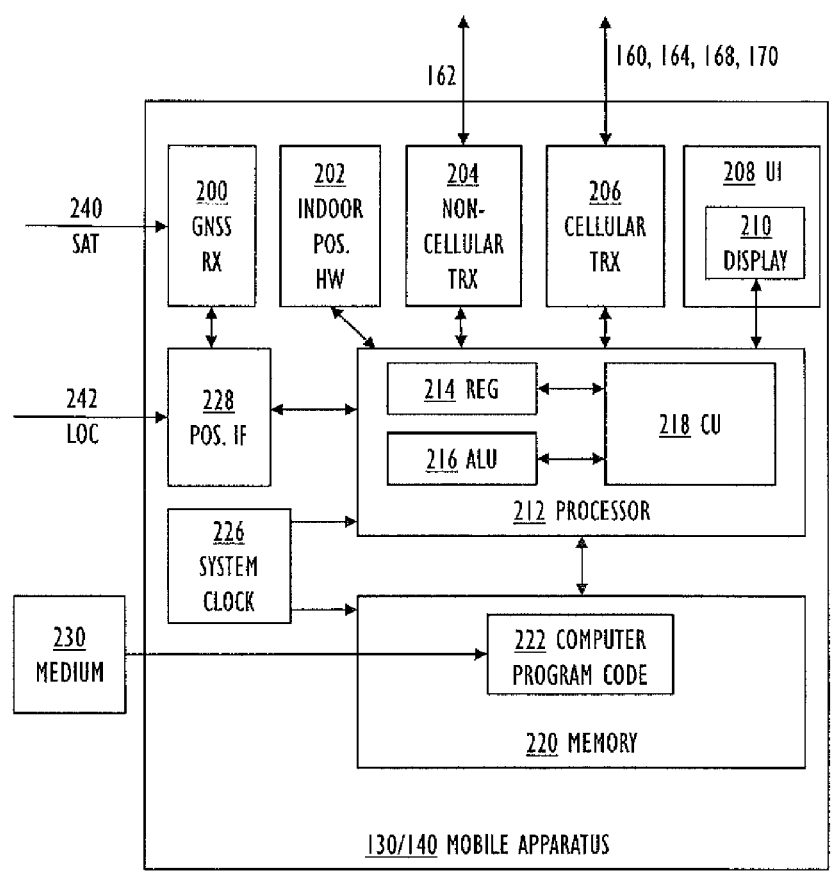
FIG. 2 illustrates example embodiments of a mobile apparatus.

In an example embodiment, the mobile apparatus 130, 140 is a portable electronic communication apparatus. A non-exhaustive list of the types of the mobile apparatus 130, 140 includes: a mobile phone, a smartphone, a tablet computer, a phablet, a smartwatch, a general-purpose mobile computing device. In an example embodiment, the mobile apparatus 130, 140 is a general-purpose off-the-shelf computing device, as opposed to a purpose-build proprietary equipment, whereby research & development costs will be lower as only the special-purpose software (and not the hardware) needs to be designed, implemented and tested. In FIG. 2, an example embodiment of the mobile apparatus 130, 140 is illustrated: the mobile apparatus 130, 140 is a smartphone or a tablet employing a (multi-touch) display 210. Such devices may employ a suitable operating system such as iOS, Android, or Windows Phone, for example.

FIG. 2 illustrates further example embodiments of the mobile apparatus 130, 140. The mobile apparatus 100 comprises the display 210, one or more processors 212, and one or more memories 220 including computer program code 222.

In an example embodiment, the display 210 is implemented by an appropriate technology, such as a liquid crystal display (LCD), a thin-film transistor (TFT) display, a light-emitting diode (LED) display, an organic LED (OLED) display, an electroluminescent display (ELD), or an electronic paper (or e-paper or electronic ink) display, for example. The display 210 may also incorporate other user interaction means, such as touch input, or haptic feedback, i.e. the display may be a multi-touch display 210.

In an example embodiment, the display 210 is a part of the user interface 208 implementing the exchange of graphical, textual and auditory information with a user. The user interface 208 may be realized with various techniques, such as the display 210, means for producing sound, a keyboard, and/or a keypad, for example. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 208 may comprise other user interface components, for example various means for focusing a cursor (mouse, track ball, arrow keys, touch sensitive area etc.) or elements enabling audio control.

In an example embodiment, the mobile apparatus 130, 140 further comprises a positioning interface 228 configured to obtain an own location of the mobile apparatus 130, 140. As illustrated in FIG. 2, the positioning interface 228 may obtain the location data 240, 242 from various sources.

In an example embodiment, the mobile apparatus 130, 140 comprises a GNSS receiver 200, which generates the location data on the basis of signals 240 received from Earth-orbiting satellites. The GNSS may be GPS (Global Positioning System) of the USA, Galileo of the European Union, GLONASS of Russia, Beidou of China, or IRNSS of India, for example. Besides GNSS, or instead of GNSS, other location techniques may be utilizes as well such as those developed for use in cellular radio networks.

In an example embodiment, the mobile apparatus 130, 140 comprises indoor positioning hardware (and software) 202, which generates the location data. The indoor positioning hardware 202 may comprise a magnetometer to measure variations in the magnetic field of the Earth caused by building structures (especially by steel-reinforced concrete). Furthermore, in some cases, the indoor positioning hardware 202 may comprise an acceleration sensor (measuring in one, two or three dimensions) and/or a gyroscope, for example. It is to be noted that the magnetic positioning hardware 202 and software 222 co-operate with the magnetic positioning management apparatus 100 in order to implement the magnetic positioning.

In an example embodiment, the mobile apparatus 130, 140 comprises a cellular radio transceiver 206 and/or a non-cellular radio transceiver 204. The positioning interface 228 may obtain the location data as obtained/generated on the basis of the wireless communication utilizing the transceivers 204 and/or 206.

In an example embodiment, the cellular radio transceiver 206 may be interoperable with the already-mentioned various wireless standard/non-standard/proprietary cellular communication networks 180 such as any mobile phone network.

In an example embodiment, the non-cellular radio transceiver 204 may utilize a short-range radio transceiver such as a Bluetooth, Bluetooth low energy (BLE), Wi-Fi (or WiFi) or other WLAN transceiver (based on IEEE (Institute of Electrical and Electronics Engineers) 802.11 standard or its evolution versions (IEEE 802.11ac etc.), for example).

The positioning interface 228 may also obtain the location data with some other means. In an example embodiment, the mobile apparatus 130, 140 may comprise a radio frequency identification (RFID) reader configured to read the location data from an RFID tag attached fixedly to a known location. In an example embodiment, the mobile apparatus 130, 140 comprises a camera, and the location data may be obtained by photographing a machine readable code (such as a barcode or a QR code) attached fixedly to a known location or by photographing or recording video (from a floor, walls and/or ceiling) and identifying the location from identified unique features.

The term 'processor' 212 refers to a device that is capable of processing data. Depending on the processing power needed, the mobile apparatus 130, 140 may comprise several processors 212 such as parallel processors or a multicore processor. When designing the implementation of the processor 212, a person skilled in the art will consider the requirements set for the size and power consumption of the mobile apparatus 130, 140, the necessary processing capacity, production costs, and production volumes, for example. The processor 212 and the memory 220 may be implemented by an electronic circuitry.

The term 'memory' 220 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

In an example embodiment, a system clock 226 constantly generates a stream of electrical pulses, which cause the various transferring operations within the mobile apparatus 130, 140 to take place in an orderly manner and with specific timing.

In an example embodiment, the processor 212 may be implemented as a microprocessor implementing functions of a central processing unit (CPU) on an integrated circuit. The CPU is a logic machine executing a computer program code 222. The computer program code 222 may be coded as a computer program using a programming language, which may be a high-level programming language, such as C, C++, or Java, or a low-level programming language, such as a machine language, or an assembler, for example. The CPU may comprise a set of registers 214, an arithmetic logic unit (ALU) 216, and a control unit (CU) 218. The control unit 218 is controlled by a sequence of the computer program code 222 transferred to the CPU from the (working) memory 220. The control unit 218 may contain a number of microinstructions for basic operations. The implementation of the microinstructions may vary, depending on the CPU design. The microprocessor 212 may also have an operating system (a dedicated operating system of an embedded system, a real-time operating system, or even a general-purpose operating system), which may provide the computer program code 222 with system services.

A non-exhaustive list of implementation techniques for the processor 212 and the memory 220 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 222 may be implemented by software and/or hardware. In an example embodiment, the software may be written by a suitable programming language, and the resulting executable code 222 may be stored on the memory 220 and run by the processor 212.

In an example embodiment, the functionality of the hardware may be designed by a suitable hardware description language (such as Verilog or VHDL), and transformed into a gate-level netlist (describing standard cells and the electrical connections between them), and after further phases the chip implementing the processor 212, memory 220 and the code 222 of the mobile apparatus 130, 140 may be fabricated with photo masks describing the circuitry.

In an example embodiment, the processor 212 and the memory 220 are separate entities, communicatively coupled together by an appropriate serial bus, for example. In general interfaces between the various elements may be implemented with suitable interface technologies, such as a message interface, a method interface, a sub-routine call interface, a block interface, an appropriate serial/parallel bus, or any hardware/software means enabling communication between various sub-units of the mobile apparatus 100.

An example embodiment provides a computer-readable medium 230 comprising a computer program comprising the computer program code 222 which, when loaded into the mobile apparatus 100 causes the mobile apparatus 100 to perform required operations relating to the magnetic positioning.

Naturally, the mobile apparatus 130, 140 may include various other parts, such as a battery, a camera, or a radio-frequency identifier reader, but as they are not needed to further illustrate the example embodiments, they will not be further described.

In an example embodiment, the communication network 180 comprises at least one wireless standard/non-standard/proprietary communication network, which is coupled with a wired network such as the Internet.

In an example embodiment, the wireless communication network 180 comprises any mobile phone network, regardless of the generation (such as 2G, 3G, 4G, beyond 4G, 5G etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), Mobile WiMAX, and other radio systems (in their present forms and/or in their evolution forms).

In an example embodiment, the communication network 180 supports the use of subscriber identity module (SIM), which may be an integrated circuit storing subscriber data, which is network-specific information used to authenticate and identify the subscriber on the cellular network. The subscriber+ identity module may be embedded into a removable SIM card. Consequently, the mobile apparatus 130, 140 may include the SIM card (and a SIM card reader). Alternatively, the mobile apparatus 130, 140 may include a virtual or software SIM card.

In an example embodiment, the wireless communication network 180 comprises a wireless local area network (WLAN), a hotspot, or an access point, all of which may provide Internet access through the use of a router connected to a link to an Internet service provider.

As illustrated in FIG. 1, the magnetic positioning management apparatus 100 comprises one or more processors 104 and one or more memories 106 including computer program code 108.

The processor 104 and the memory 106 may be implemented by electronic circuits.

The term 'processor' 104 refers to a device that is capable of processing data. Depending on the processing power needed, the magnetic positioning management apparatus 100 may comprise several processors 104 such as parallel processors or multicore processors. When designing the implementation of the processor 104, a person skilled in the art will consider the requirements set for the size and power consumption of the magnetic positioning management apparatus 100, the necessary processing capacity, production costs, and production volumes, for example.

The term 'memory' 106 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

In an example embodiment, the processor 104 may be implemented as a microprocessor implementing functions of a central processing unit (CPU) on an integrated circuit. The CPU is a logic machine executing the computer program code 108. The computer program code 108 may be coded as a computer program using a programming language, which may be a high-level programming language, such as C, C++, or Java, or a low-level programming language, such as a machine language, or an assembler, for example. As illustrated in FIG. 2 (for the mobile apparatus 130, 140, but the structure may be similar, changing such things that need to be changed, for the magnetic positioning management apparatus 100), the CPU 104 may comprise a set of registers 214, an arithmetic logic unit (ALU) 216, and a control unit (CU) 218. The control unit 218 is controlled by a sequence of the computer program code 108 transferred to the CPU from the (working) memory 106. The control unit 218 may contain a number of microinstructions for basic operations. The implementation of the microinstructions may vary, depending on the CPU design. The microprocessor 104 may also have an operating system (a dedicated operating system of an embedded system, a real-time operating system, or even a general-purpose operating system), which may provide the computer program code 108 with system services.

An example embodiment provides a computer-readable medium 150 comprising a computer program comprising the computer program code 108 which, when loaded into the magnetic positioning management apparatus 100 causes the magnetic positioning management apparatus to perform the operations required to implement the functionality of the example embodiments.

The example embodiments of the magnetic positioning management apparatus 100 may be used to enhance the operation of the computer program code 108. There are many ways to structure the computer program code 108. In an example embodiment, the operations of the computer program code 108 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 108 for performing a wide variety of standard operations. In an example embodiment, the computer program code 108 may be in source code form, object code form, executable file, or in some intermediate form. The computer-readable medium 150 may comprise at least the following: any entity or device capable of carrying computer program code 108 to the magnetic positioning management apparatus 100, a record medium, a computer memory, a read-only memory, an electrical carrier signal, a telecommunications signal, and a software distribution medium. In some jurisdictions, depending on the legislation and the patent practice, the computer-readable medium 150 may not be the telecommunications signal. In an example embodiment, the computer-readable medium 150 may be a non-transitory computer-readable storage medium.

The one or more memories 106 and the computer program code 108 are configured to, with the one or more processors 104, cause the magnetic positioning management apparatus 100 at least to perform the following four-phase sequence of operations:

110) Assign an identifier for a transmitting mobile apparatus 130.

112) Command 160 the transmitting mobile apparatus 130 to transmit a radio beacon 162 including the identifier.

114) Receive 164 reception information from a receiving mobile apparatus 140 that received the radio beacon 162, the reception information including the identifier of the transmitting mobile apparatus 130.

116) For at least one of the transmitting mobile apparatus 130 or the receiving mobile apparatus 140, determine 168A/168B its estimated location 190A/190B for a magnetic positioning 120 based 118 on an association of the transmitting mobile apparatus 130 with the receiving mobile apparatus 140.

The association of the transmitting mobile apparatus 130 with the receiving mobile apparatus 140 indicates that they both occupy or occupied the same space, in a building or a part of the building, This means that they occupy or occupied the same space, or at least that their routes crossed or passed each other, for example, which aids in determining the 116 the estimated location 190A, 190B.

In an example embodiment, the association indicates that the transmitting mobile apparatus 130 and the receiving mobile apparatus 140 are or were within a radio range 166 of each other. This means that they occupy or occupied the same space, or at least that their routes adjoined each other. The radio range 166 depends on the nature and transmission power of the radio beacon 162.

In an example embodiment, the actual magnetic positioning 120 may commence in co-operation 170A/170B with the transmitting mobile apparatus 130 and/or the receiving mobile apparatus 140, whose magnetic positioning 120 was initialized with the estimated location 190A/190B.

In an example embodiment, instead of initialization, the estimated location 190A, 190B is utilized in connection with an ongoing magnetic positioning, in order to improve the accuracy of the positioning, or in order to correct the result of the positioning, for example, With the described processing, the transmitting mobile apparatus 130 transmits the beacon 162, and the receiving mobile apparatus 140 receives the beacon 162. In an example embodiment, if the indoor location 192A of the transmitting mobile apparatus 130 is known, the indoor location 190B of the receiving mobile apparatus 140 may be estimated, or, alternatively, if the indoor location 192B of the receiving mobile apparatus 140 is known, the indoor location 190A of the transmitting mobile apparatus 130 may be estimated. In an example embodiment, the magnetic positioning management apparatus 100 is caused to obtain a probabilistic location 192A/192B for one of the transmitting mobile apparatus 130 or the receiving mobile apparatus 140, whose indoor location is known, and for one of the transmitting mobile apparatus 130 or the receiving mobile apparatus 140, whose indoor location is not known, to determine its estimated location 190A/190B based also on the probabilistic location 192B/192A. Note that "known" here refers to the fact that the indoor location has been determined with an accuracy that may vary: the known indoor location may be very accurate, within an error margin of a few meters, or less accurate, such as being specific to a certain area (possibly having some radius like 100 meters or less or more, for example).

The described processing implements a co-operative positioning. The association of the transmitting mobile apparatus 130 with the receiving mobile apparatus 140 makes it possible to utilize the positioning information obtained by both apparatuses 130, 140 in order to generate the estimated location 190A, 190B for one or both of the apparatuses 130, 140. In an example embodiment, the probabilistic location 192A/192B of one mobile apparatus may be utilized to determine the estimated location 190A/190B for another apparatus, whereupon the magnetic positioning of the other mobile apparatus may be initialized with the estimated location 190A/190B, which may save system resources and make the operation faster (first fix time is shortened) and more robust. Alternatively, or additionally, the estimated location 190A, 190B may be utilized to correct or improve an already ongoing magnetic positioning 120.

In an example embodiment, the estimated location 190A, 190B is determined 116 based on the association of the transmitting mobile apparatus 130 with the receiving mobile apparatus 140 so that a location probability of the transmitting mobile apparatus 130 and a location probability of the receiving mobile apparatus 140 are processed in order to generate the estimated location 190A, 190B. In essence, the separate location probabilities, when combined, produce an improved estimation of the location 190A, 190B as compared to the singular, isolated location probabilities. An example scenario: Let us assume that the location 192A of the transmitting mobile apparatus 130 (and/or the location 192B of the receiving mobile apparatus 140) is known with some probability. Now, the receiving mobile apparatus 140 starts positioning (or continues the positioning), records sensor data, and at time t receives the radio signal 162 from the transmitting mobile apparatus 130. The information that the receiving mobile apparatus 140 must be at the radio range 166 from the transmitting mobile apparatus 130 at the time t is utilized to improve the estimated location 190B of the receiving mobile apparatus 140 (and/or the estimated location 190A of the transmitting mobile apparatus 130). One example implementation embodiment is to combine this cue, the other sensor measurements and all available map information using a particle filter. The particle filter may be operated as the user moves (with the mobile apparatus 130/140) inside a building. Another example embodiment uses a two-pass bidirectional particle filter to process the location probabilities.

The non-cellular radio transceiver 204 of the transmitting mobile apparatus 130 may be utilized to transmit the radio beacon 162, and the non-cellular radio transceiver 204 of the receiving mobile apparatus 140 may be utilized to receive the radio beacon 162.

In an example embodiment, the radio beacon 162 is a specific radio signal. The radio beacon 162 may include one or more radio frames or data packets, or other data structures. The radio beacon 162 may be transmitted periodically, a predetermined number of times, for a predetermined time period, or as instructed by the magnetic positioning management apparatus 100 from a start to a finish, for example.

In an example embodiment, the radio beacon 162 is implemented with Apple® iBeacon® technology utilizing low-powered transmitters (such as Bluetooth® Low Energy BLE or Bluetooth® Smart transmitters). The iBeacon frame may include a variable UUID (Universally Unique Identifier), which may be used transmit the identifier of the transmitting mobile station 130.

Figure 3:
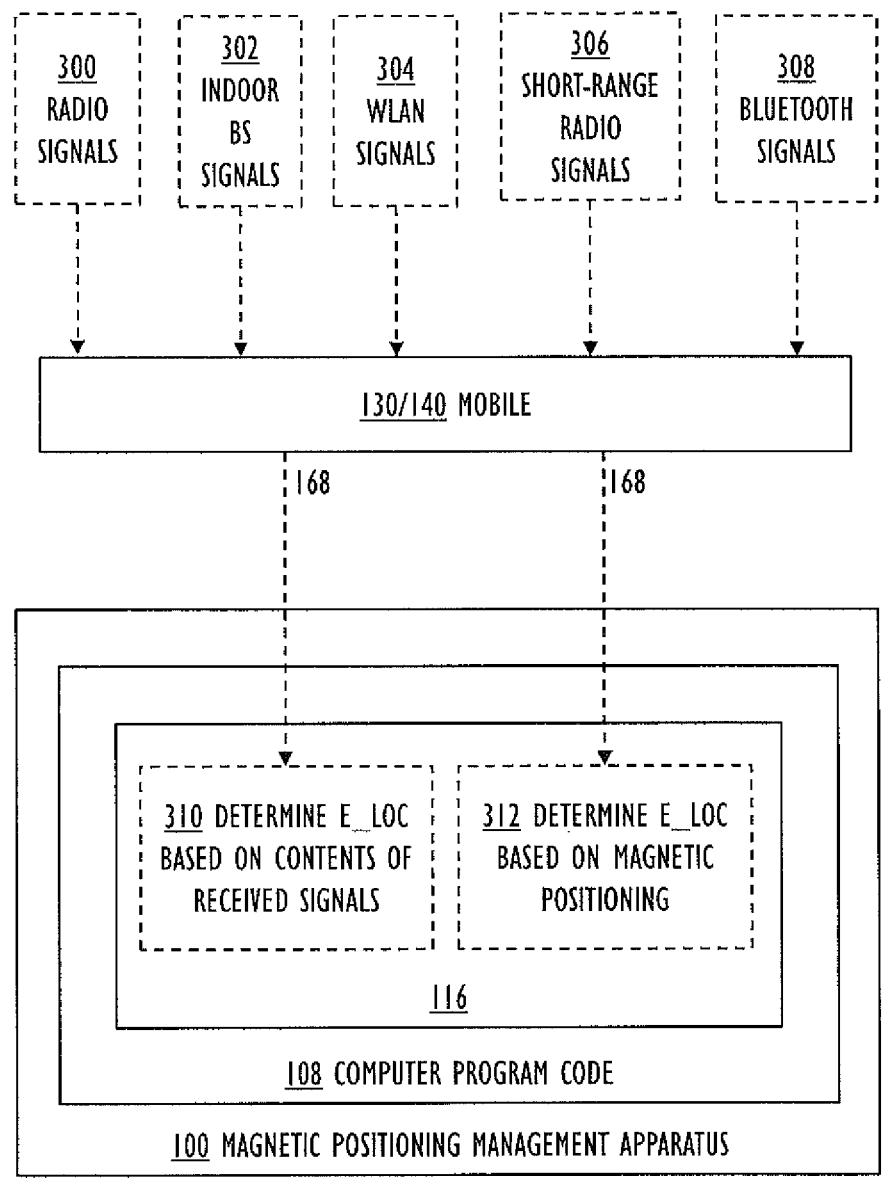
FIGS. 3, 4, 5, 6, 7 and 8 illustrate further example embodiments of the magnetic positioning management apparatus.

How is the estimated location 190A, 190B determined? Let us study FIG. 3 for some example embodiments. In essence, in some example embodiments, the estimated location 190A/190B has been determined either for the transmitting mobile station 130 or for the receiving mobile station 140. The example embodiments describe two ways for the indoor location determination: either based on contents of received radio signals 310, or based on a magnetic positioning 312.

In an example embodiment, the radio signals are transmitted by a wireless local area network (WLAN, such as Wi-Fi or IEEE 802.11 series, for example), a hotspot, or an access point, all of which may provide Internet access through the use of a router connected to a link to an Internet service provider.

In an example embodiment, the estimated location 190A/190B is determined 310 based also on contents of radio signals 300 received by at least one of the transmitting mobile apparatus 130 or the receiving mobile apparatus 140.

In an example embodiment, the estimated location 190A/190B is determined 310 based also on contents of indoor base station signals 302 received by at least one of the transmitting mobile apparatus 130 or the receiving mobile apparatus 140.

In an example embodiment, the estimated location 190N/190B is determined 310 based also on contents of wireless local area network signals 304 received by at least one of the transmitting mobile apparatus 130 or the receiving mobile apparatus 140.

In an example embodiment, the estimated location 190A/190B is determined 310 based also on contents of short-range radio signals 306 received by at least one of the transmitting mobile apparatus 130 or the receiving mobile apparatus 140.

In an example embodiment, the estimated location 190A/190B is determined 310 based also on contents of Bluetooth® radio signals 308 received by at least one of the transmitting mobile apparatus 130 or the receiving mobile apparatus 140.

In an example embodiment, the radio signals are transmitted with any above-mentioned technology, but not with iBeacon® technology. This allows for such a use case, where the estimated location 190A, 190B is obtained with radio signals other than iBeacon®, and then also a mobile apparatus not supporting positioning with radio signals other than iBeacon® may determine its estimated location 190A, 190B by communicating (either by transmitting or receiving) through iBeacon® with a mobile apparatus supporting positioning with radio signals other than iBeacon®. With this kind of configuration, even iOS® devices, normally not capable of utilizing short-range radio signals for obtaining initial indoor location, may utilize this kind of location information through iBeacon® communication with other devices (such as Android®). It is to be noted, that besides iOS® devices, also other devices such as Android® devices support iBeacon® and Bluetooth® technology.

In an example embodiment, the estimated location 190A/190B is determined 312 based also on a magnetic positioning of at least one of the transmitting mobile apparatus 130 or the receiving mobile apparatus 140.

Figure 4:
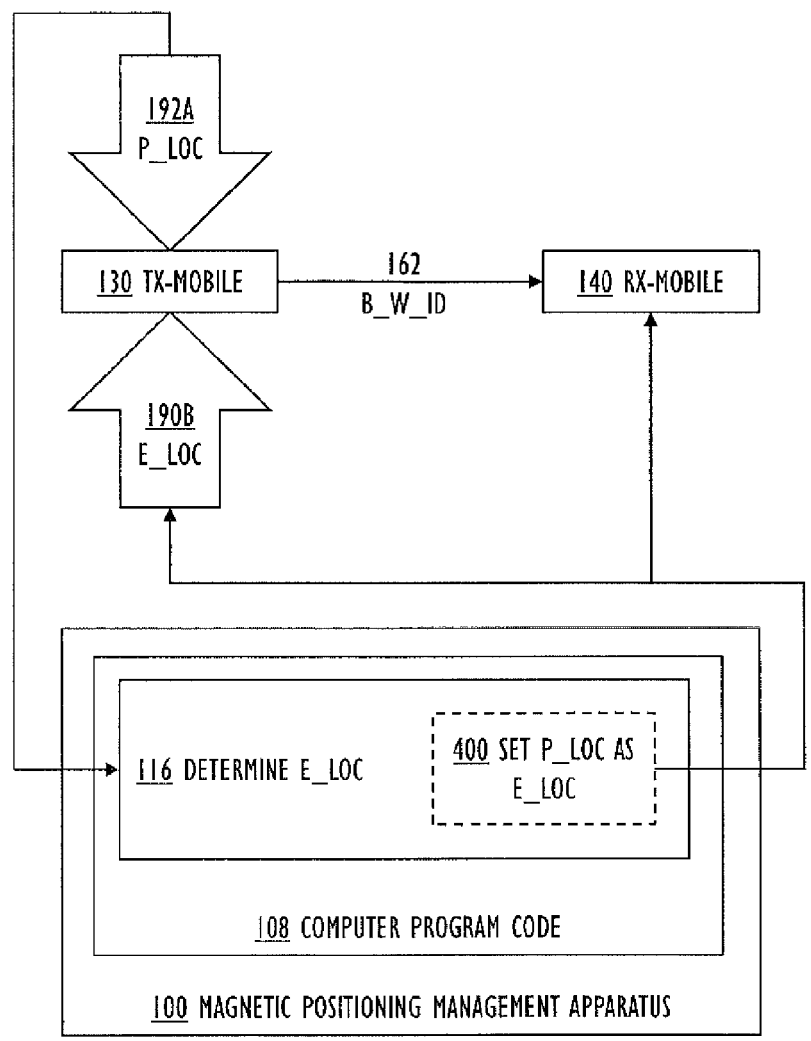
Figure 5:
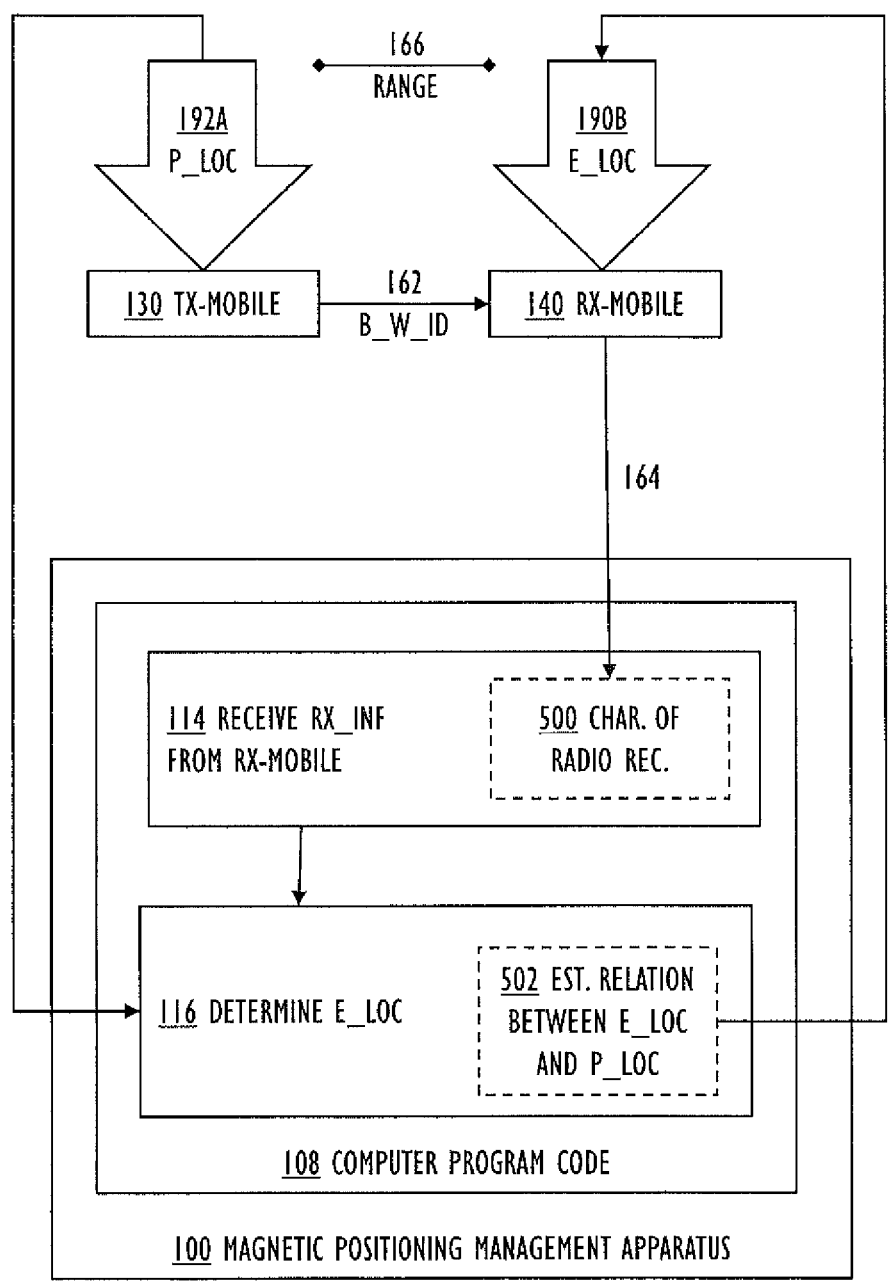
Figure 6:
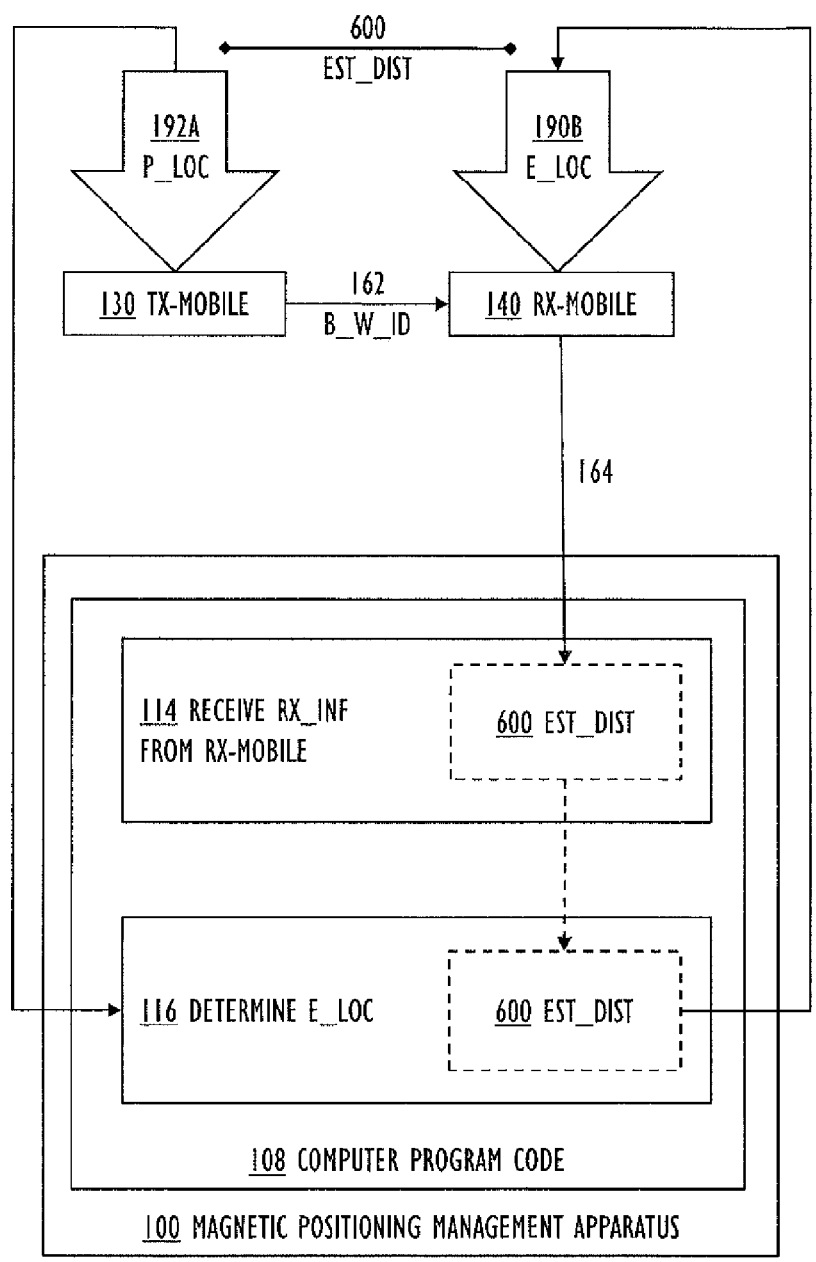

Let us next study FIGS. 4, 5 and 6, which illustrate further example embodiments of the magnetic positioning management apparatus 100, especially in view of determining the probabilistic location 192A/192B.

In an example embodiment illustrated in FIG. 4, in order to determine 116 the estimated location 190B, the probabilistic location 192A is set 400 as the estimated location 190B. Even though the locations 192A, 190B were in reality not the same, the estimated location 190B is precise enough so that the magnetic positioning 120 may then pinpoint the precise location fast.

In an example embodiment illustrated in FIG. 5, the reception information 164 further includes information 500 on characteristics of radio reception of the radio beacon 162, and, in order to determine 116 the estimated location 190B, the characteristics 500 of the radio reception of the radio beacon 162 are taken into account. For example: received signal strength of the radio beacon 162 may give a rough or even a relatively precise estimate of the range 166 of the received radio beacon 162. In the above explained example embodiment, wherein the magnetic positioning management apparatus 100 is caused to obtain a probabilistic location 192A for one of the transmitting mobile apparatus 130 or the receiving mobile apparatus 140 (in the example of FIG. 5 for the transmitting mobile apparatus 130), whose indoor location is known, and for one of the transmitting mobile apparatus 130 or the receiving mobile apparatus 140 (in the example of FIG. 5 for the receiving mobile apparatus 140), whose indoor location is not known, to determine its estimated location 190B based on the probabilistic location 192A and an estimated relation 502 between the estimated location 190B and the probabilistic location 192A on the basis of the characteristics 500. The estimated relation may be the estimated radio range 166, for example.

In an example embodiment illustrated in FIG. 6, the reception information 164 further includes an estimated distance 600 between the transmitting mobile station 130 and the receiving mobile station 140, and, in order to determine 116 the estimated location 190B, the estimated distance 600 is taken into account. For example, in iBeacon® technology, the receiving mobile apparatus 140 receiving the radio beacon 162 may approximate the distance 600 from the transmitting mobile apparatus 130 into three ranges: immediate (within a few centimeters), near (within a couple of meters), and far (greater than ten meters away). As the standard iBeacon® range is 70 meters (with a maximum of 450 meters), the estimated location 190B is precise enough for initialization of the magnetic positioning 120. The iBeacon® frame may include a TX Power field representing the transmitting device's signal reference intensity a meter away from it. The receiving device determines the intensity of the received signal and compares the reference value received in the TX Power to the intensity of the received signal in order to compute an estimation of the distance 600. In the above explained example embodiment, wherein the magnetic positioning management apparatus 100 is caused to obtain a probabilistic location 192A for one of the transmitting mobile apparatus 130 or the receiving mobile apparatus 140 (in the example of FIG. 6 for the transmitting mobile apparatus 130), whose indoor location is known, and for one of the transmitting mobile apparatus 130 or the receiving mobile apparatus 140 (in the example of FIG. 6 for the receiving mobile apparatus 140), whose indoor location is not known, to determine its estimated location 190B based on the probabilistic location 192A and the estimated distance 600.

Figure 7:
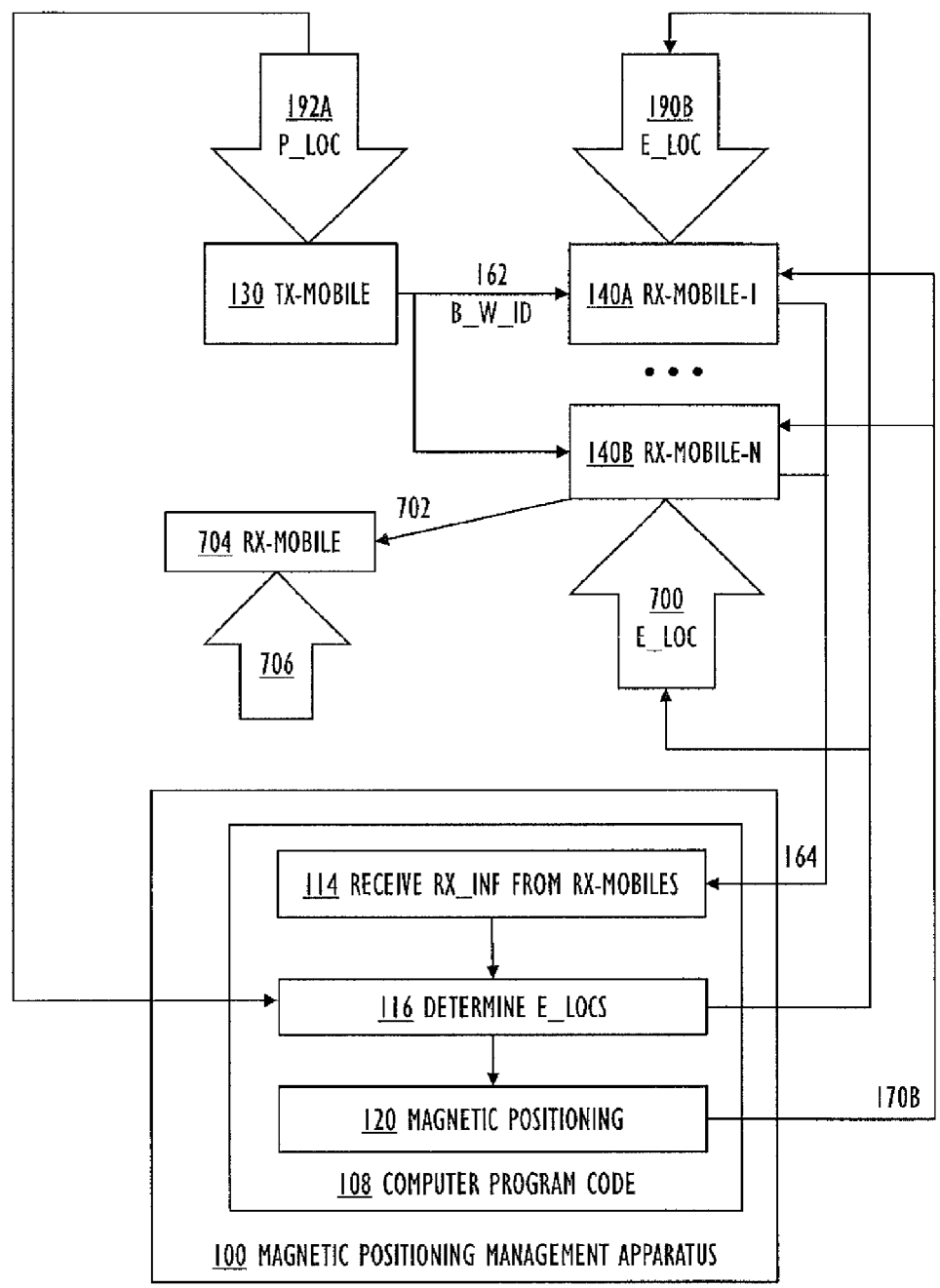
Figure 8:
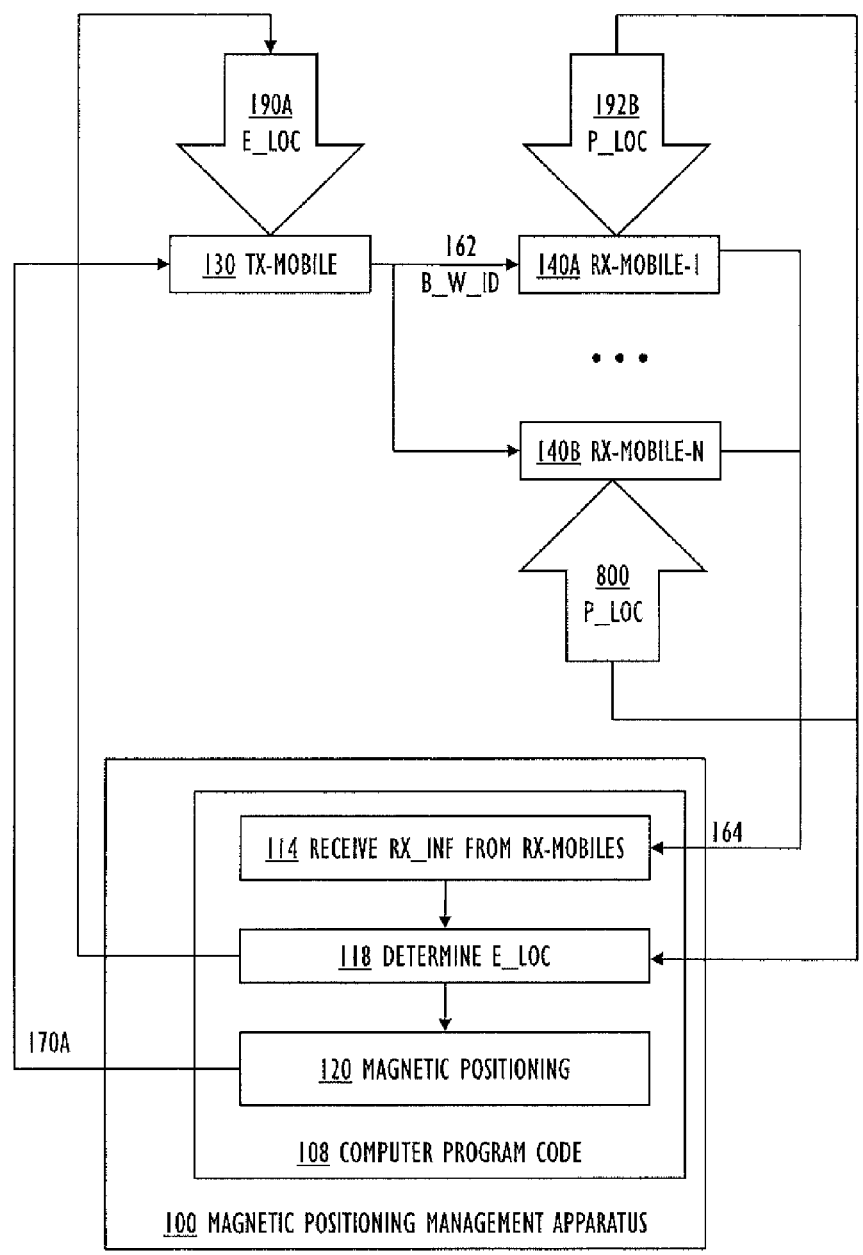

Next with reference to FIGS. 7 and 8, the two alternatives are further explained: either the probabilistic location 192A of the transmitting mobile apparatus 130 is known, or the probabilistic location 192B of the receiving mobile apparatus 140 is known.

In an example embodiment illustrated in FIG. 7, the probabilistic location 192A is obtained 116 for the transmitting mobile apparatus 130, the estimated location 190B is determined 116 for the receiving mobile apparatus 140A based on the probabilistic location 192A, and the magnetic positioning 120 of the receiving mobile apparatus 140A is processed with the estimated location 190B.

In a further example embodiment of FIG. 7, the reception information 164 is received 114 from a plurality of the receiving mobile apparatuses 140A, 140B, a plurality of the estimated locations 190B, 700 are determined 116 for the plurality of the receiving mobile apparatuses 140A, 140B (in an example embodiment based also on the probabilistic location 192A), and the plurality of the magnetic positionings 120 of the plurality of the receiving mobile apparatuses 140A, 140B are supplemented with the plurality of the estimated locations 190B, 700. The number of the receiving mobile apparatuses 140A, 140B may vary from 1 to N, wherein N is any integer greater than one. In this way, location configurations of many mobile apparatuses 140A, 140B may be found out simultaneously. Furthermore, the location configurations may be parts of complex structures as the same mobile apparatus may both transmit and receive radio beacons: let us suppose that the N:th mobile apparatus 140B, besides receiving the radio beacon 162 also transmits another radio beacon 702, which is received by a further receiving mobile apparatus 704, for which an estimated location 706 may be determined on the basis of the estimated location 700 of the N:th receiving mobile station 140B.

In an example embodiment, for the determination 116 of the estimated location 190A, 190B, co-operation information comprising at least one of data relating to another mobile apparatus communicating another radio beacon with the transmitting mobile apparatus 130, data relating to another mobile apparatus 704 communicating another radio beacon 702 with the receiving mobile apparatus 140B is taken into account. With this example embodiment, a plurality of mobile apparatuses 130, 140A, 140B, 704, which are within radio ranges of each other, may better locate themselves in a co-operative fashion. In a way, the locations of the mobile apparatuses 130, 140A, 140B, 704 form a mesh on a map, and as the information is combined, the location configuration of all apparatuses 130, 140A, 140B, 704 may be determined.

In an example embodiment illustrated in FIG. 8, (in an example embodiment, the probabilistic location 190B is obtained for the receiving mobile apparatus 140A, and, based on this) the estimated location 190A is determined 116 for the transmitting mobile apparatus 130, and the magnetic positioning 120 of the transmitting mobile apparatus 130 is initialized with the estimated location 190A.

In a further example embodiment of FIG. 8, the reception information 164 is received 114 from a plurality of the receiving mobile apparatuses 140A, 140B, (in an example embodiment, a plurality of the probabilistic locations 192B, 800 are obtained for the plurality of the receiving mobile apparatuses 140A, 140B, and, based on this) and the estimated location 190A is determined 116 for the transmitting mobile apparatus. In an example embodiment, triangulation technology may be used to determine the estimated location 190A for the transmitting mobile station 130: the magnetic positioning management apparatus 100 may triangulate the estimated location 190A (with reception power information obtained from two or more receiving mobile apparatuses 140A, 140B, for example).

Let us next study FIGS. 9, 10, 11 and 12, which illustrate further example embodiments of the magnetic positioning management apparatus 100, especially in view of using an Earth's magnetic field EMF map of a building by the magnetic positioning 122.

In an example embodiment, the magnetic positioning comprises an indoor magnetic positioning, and, consequently, the determination 116 generates an estimated indoor location 190A, 190B, possibly based on a probabilistic indoor location 192A, 192B. It is to be noted that the magnetic positioning functions inside a building, but also between buildings and near a building. This is due to the fact that the building structures cause variations to the magnetic field of the Earth.

In the magnetic positioning of the mobile apparatus 130, 140, each EMF vector measured by the mobile apparatus 130, 140 carried by a person may be compared to existing information, wherein the information may comprise EMF vector strength and direction in several locations within a building or within a plurality of buildings. The information may thus depict an indoor Earth's magnetic field map. As implied by the word "map", the EMF map comprises location specific data: each location in the map is associated with a certain EMF value (magnitude and/or direction), for example. As the amount of data in the EMF map, typically covering many buildings, may be large, the EMF map may be stored in the magnetic positioning management apparatus 100 instead of the mobile apparatus 130, 140 having limited computational capabilities. The mobile apparatus 130, 140 may thus transmit EMF measurement results to the magnetic positioning management apparatus 100, which performs the comparison against the EMF map. As a result, the magnetic positioning management apparatus 100 may then return a location estimate to the mobile apparatus 130, 140. In another example embodiment, the database storing the EMF map, or at least part of the EMF map, is in the mobile apparatus 130, 140. In an example embodiment, the EMF map may be utilized in determining 116 the estimated location 190A, 190B as the radio range 166 may be used to determine which locations are possible. Especially, if the probabilistic location 192A, 192B is known, the radio range 166 may help in determining possible locations on the map.

Figure 9:
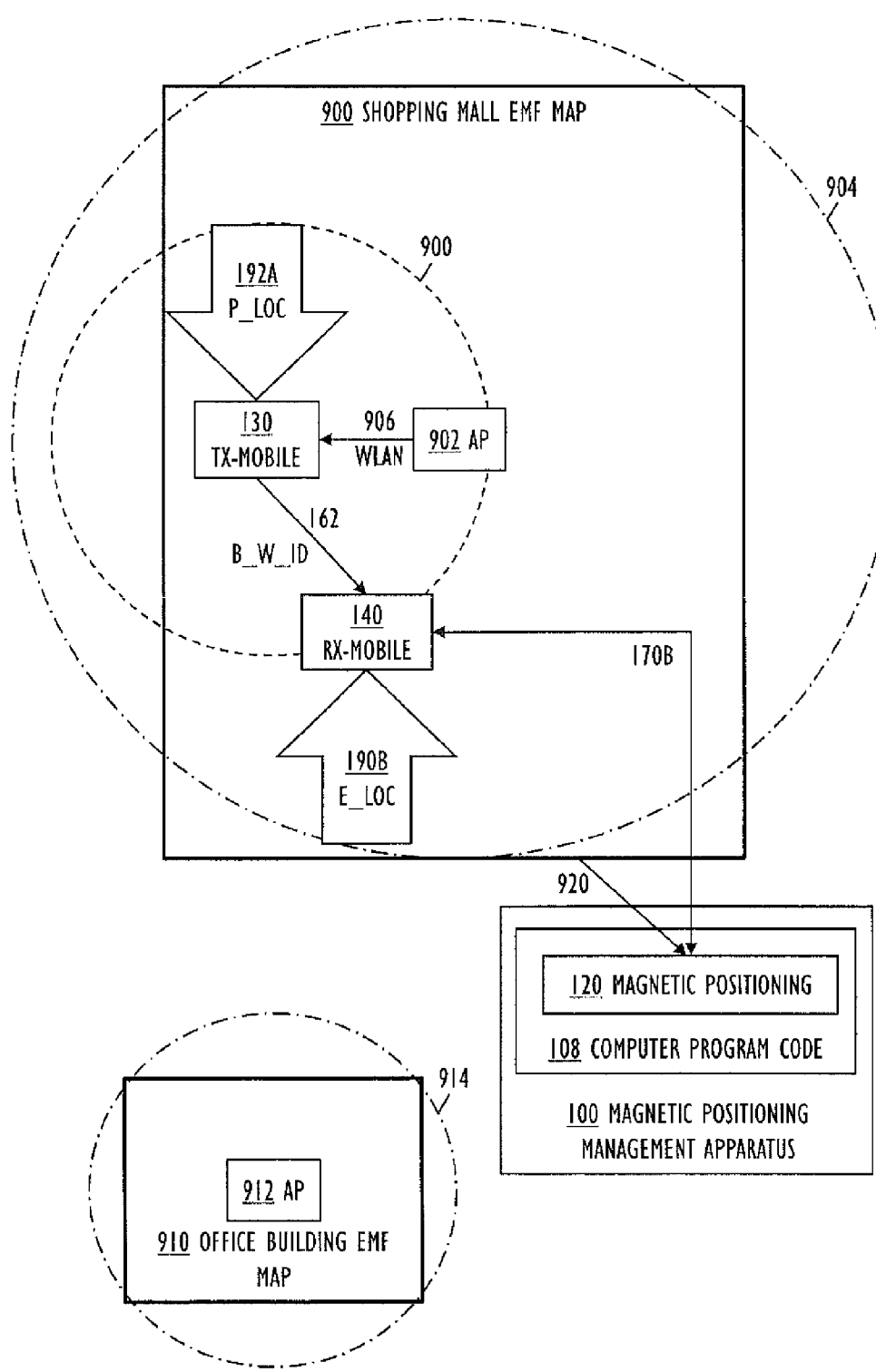
FIGS. 9, 10, 11 and 12 illustrate example embodiments of an Earth's magnetic field EMF map.

FIG. 9 illustrates an example embodiment, wherein the EMF map for the building is chosen 920 from among a plurality of EMF maps 900, 910 for a plurality of buildings for use by the magnetic positioning 122 based on the estimated location 190B. In our example embodiment, we have two buildings, a shopping mall and an office building, and their EMF maps 900, 902. Each building is serviced by an access point 902, 912 implementing a radio cell 904, 914. The user of the receiving mobile station 140 has walked into the shopping mall. The transmitting mobile station 130 has received WLAN signal 906 from the access point 902, and on the basis of the WLAN signal, the transmitting mobile station 130 has obtained its probabilistic location 192A. Next, the receiving mobile station 140 receives the radio beacon 162 transmitted by the transmitting mobile station 130. The magnetic positioning management apparatus 100 is now capable of determining that the receiving mobile apparatus 140 is within the shopping mall (and not within the office building, for example), and the estimated location 190B is determined for the receiving mobile apparatus 100. The EMF map 900 for the building (=shopping mall) is chosen 920 for use by the magnetic positioning 122 of the receiving mobile apparatus 140.

Figure 10:
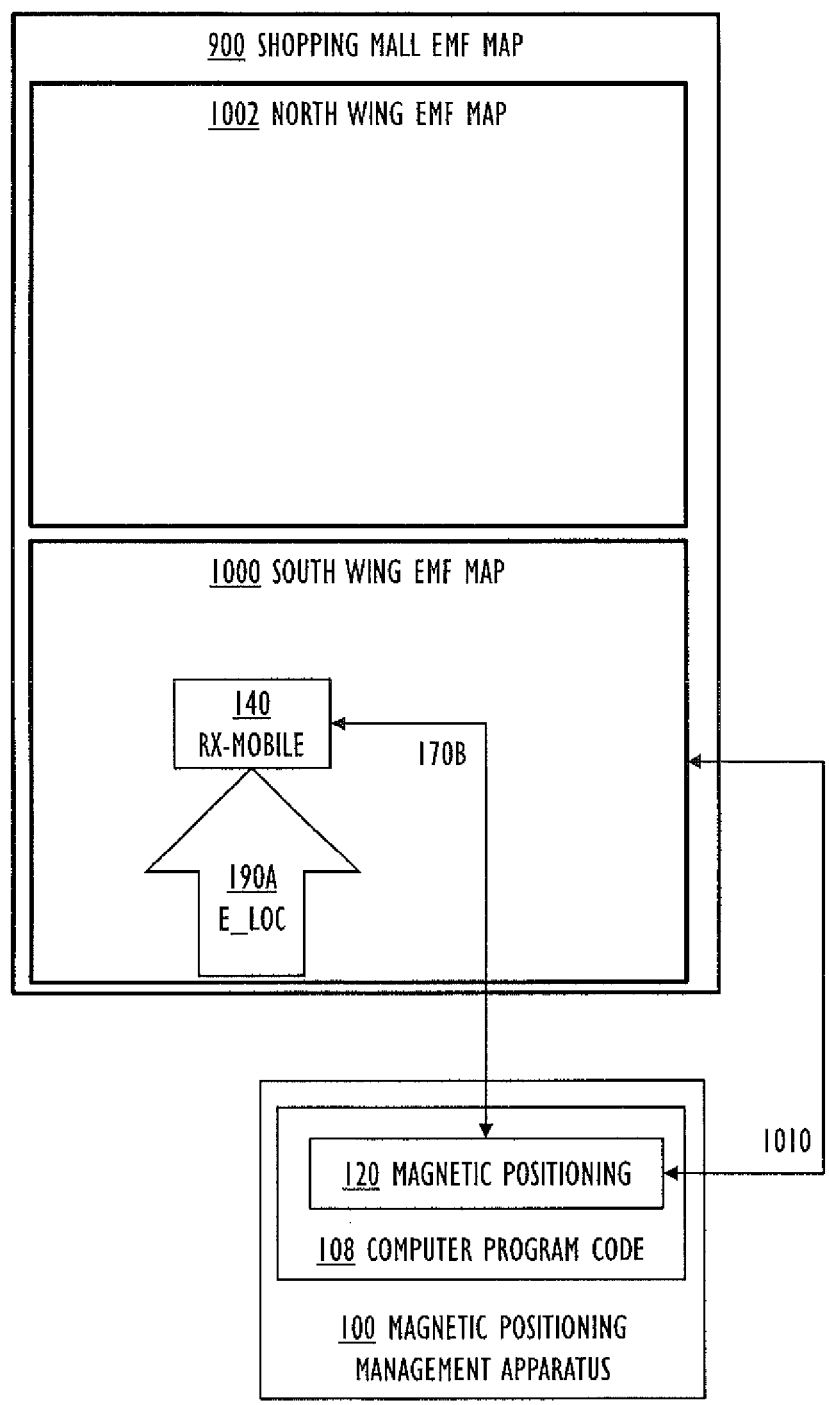
Figure 11:
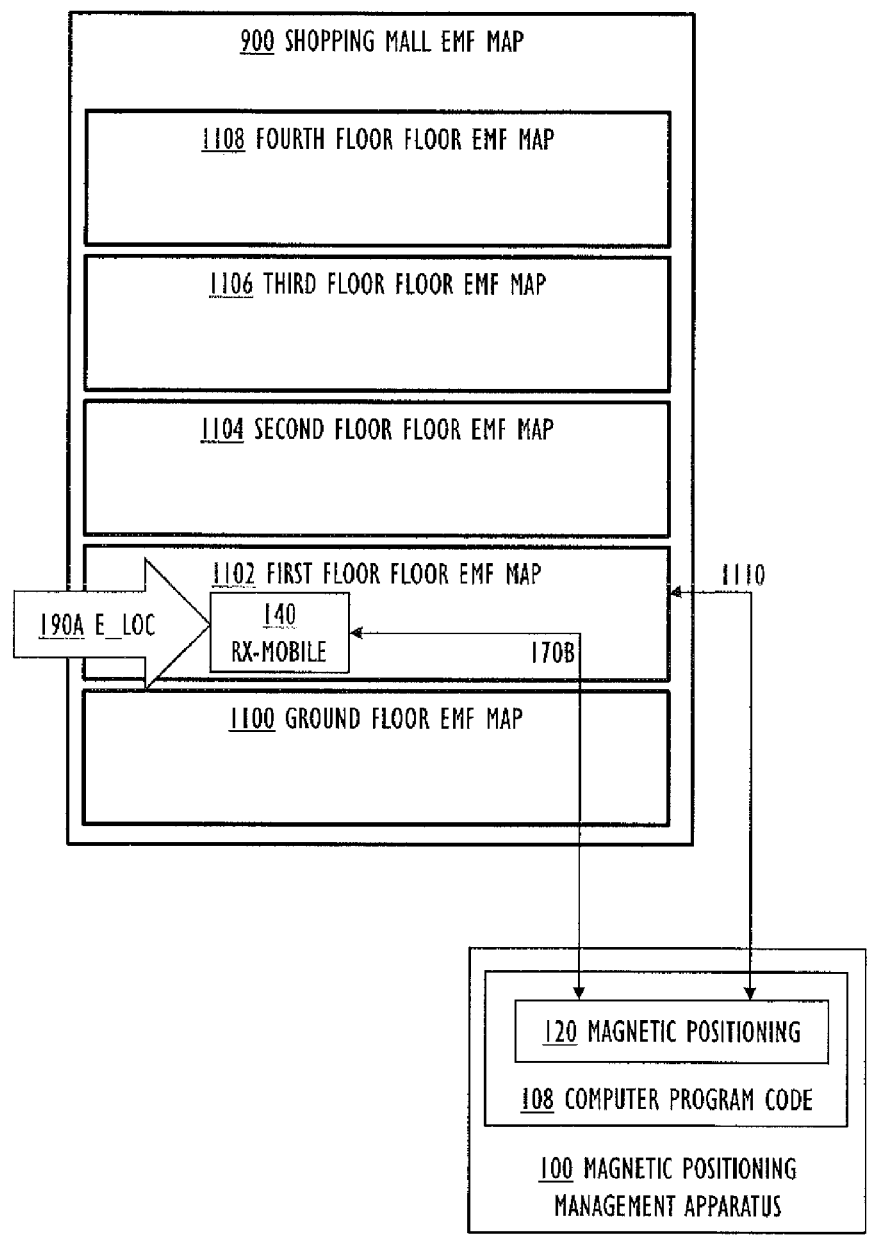

FIGS. 10 and 11 illustrate an example embodiment, wherein a part 1000, 1102 of the EMF map 900 of the building is chosen 1010, 1110 for use by the magnetic positioning 124 based on the estimated location 190A. In FIG. 10, two adjacent EMF maps exist: a map 1000 for the south wing and a map 1002 for the north wing of the building. In FIG. 11, the adjacent maps 1100, 1102, 1104, 1106, 1108 are for different floors of the building.

Figure 12:
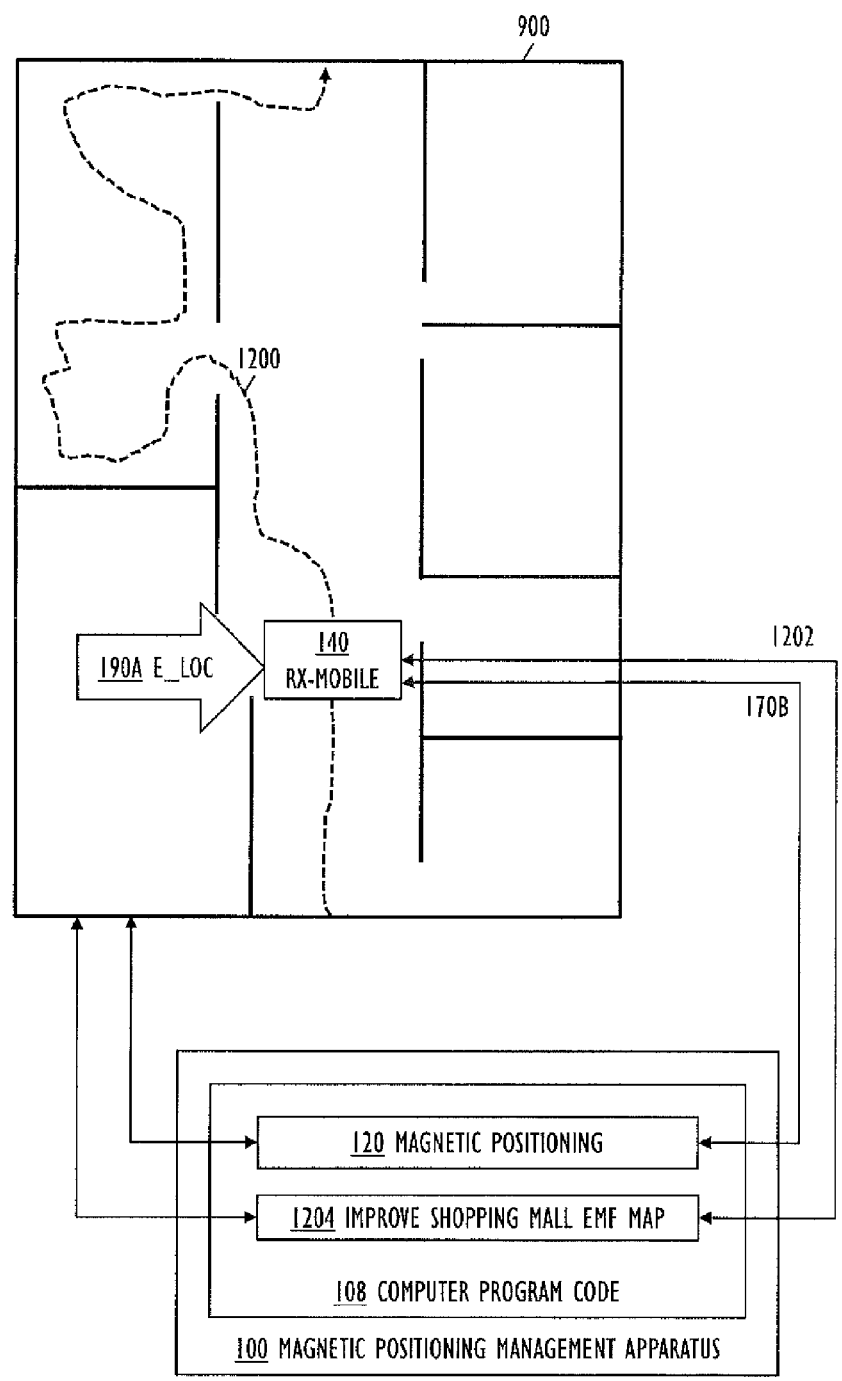

FIG. 12 illustrates an example embodiment, wherein new EMF map data 1202 is received from one of the transmitting mobile apparatus 130 or the receiving mobile apparatus 140 (in our example embodiment from a route 120 of the receiving mobile apparatus 140), whose magnetic positioning 122 is initialized with the estimated location 190A, and the EMF map 900 of the building is improved 1204 based on the new EMF map data 1202. As the magnetic positioning needs extensive work from mappers, i.e. from persons who travel within the building and collect the EMF vector values (strength and/or direction), this example embodiment utilizes a mapping technique in which ordinary people who are running an magnetic positioning software 222 in their mobile apparatuses 130, 140 equipped with suitable hardware 202 may contribute to the generation of the EMF map 900. Such mapping technique may be called simultaneous localization and mapping (SLAM). In the proposed EMF based SLAM, persons build up the EMF map 900 in an indoor environment (without a priori knowledge of the EMF map), or update the already existing EMF map 900 within a known environment (with a priori knowledge of the current EMF map).

In an example embodiment, for the determination 116 of the estimated location 190A, 190B, history information comprising at least one of a past sensor event of the transmitting mobile apparatus 130, a past location of the transmitting apparatus 130, a past sensor event of the receiving mobile apparatus 140, a past location of the receiving mobile apparatus is taken into account 140. With this example embodiment, the determination 116 of the estimated location 190A, 190B may also utilize the history information. The past locations may be time-stamped, and if it supposed that the user can move with a certain speed, it may be estimated where the current location can be. Also, past sensor events may indicate important information: an inertial sensor (such as an acceleration sensor and/or a gyroscope), for example, may produce information from which a covered distance by the user may be estimated, based on an inertial navigation, step detection, stride information, or PDR (pedestrian dead reckoning), for example. The association of the transmitting mobile apparatus 130 with the receiving mobile apparatus 140 indicates that they may both be or have been in the same space, in a building or a part of the building, for example, or that their routes have crossed or been near to each other, which may aid in analyzing the history information in order to estimate a location configuration for at least one of the mobile apparatuses 130, 140.

In an example embodiment, for the determination 116 of the estimated location 190A, 190B, reliability information comprising at least one of a reliability of the transmitting mobile apparatus 130, a reliability of the receiving mobile apparatus 140 is taken into account. The reliability information may relate to the quality of the sensors present in the apparatus and/or to the quality of the location probabilities (probability distributions, for example): the better the quality, the more reliable the information, and, conversely, the worse the quality, the less reliable the information.

Figure 13:
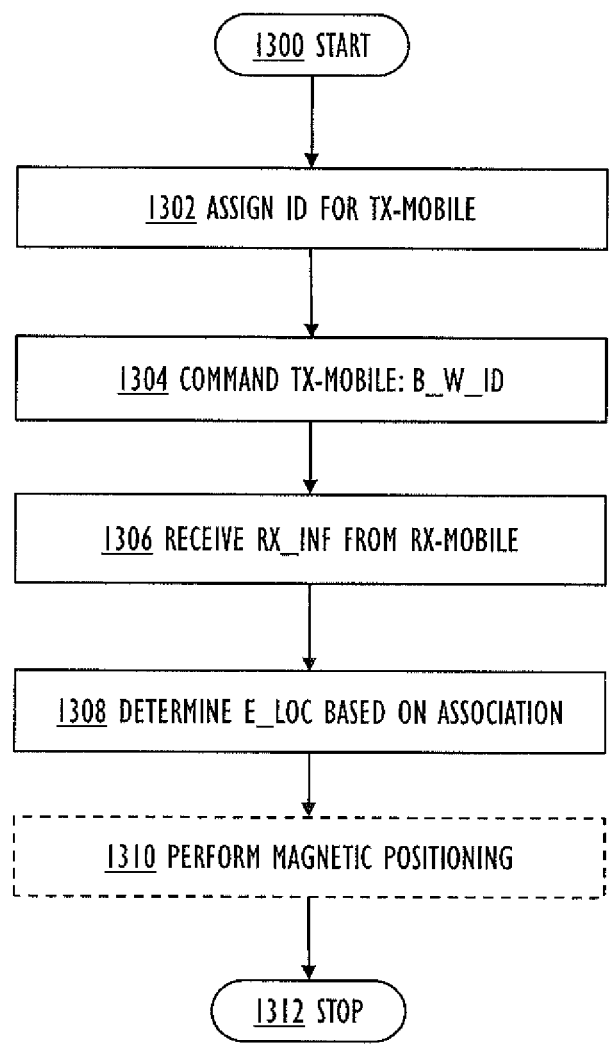
FIG. 13 is a flow chart illustrating example embodiments of a method.

Next, let us study FIG. 13 illustrating a method performed in the magnetic positioning management apparatus 100. The operations are not strictly in chronological order, and some of the operations may be performed simultaneously or in an order differing from the given ones. Other functions may also be executed between the operations or within the operations and other data exchanged between the operations.

Some of the operations or part of the operations may also be left out or replaced by a corresponding operation or part of the operation. It should be noted that no special order of operations is required, except where necessary due to the logical requirements for the processing order.

The method starts in 1300.

In 1302, an identifier is assigned for a transmitting mobile apparatus.

In 1304, the transmitting mobile apparatus is commanded to transmit a radio beacon including the identifier.

In 1306, reception information is received from a receiving mobile apparatus that received the radio beacon, the reception information including the identifier of the transmitting mobile apparatus.

For at least one of the transmitting mobile apparatus or the receiving mobile apparatus, its estimated location for a magnetic positioning is determined in 1308 based on an association of the transmitting mobile apparatus with the receiving mobile apparatus.

Optionally, in 1310, the magnetic positioning is performed for at least one of the transmitting mobile apparatus or the receiving mobile apparatus, for which the estimated location was estimated.

The method ends in 1312.

The already described example embodiments of the magnetic positioning management apparatus 100 may be utilized to enhance the method with various further example embodiments. For example, various structural and/or operational details may supplement the method.

It will be obvious to a person skilled in the art that, as technology advances, the inventive concept can be implemented in various ways. The invention and its embodiments are not limited to the example embodiments described above but may vary within the scope of the claims.

The invention claimed is:

1. A magnetic positioning management apparatus comprising:
    one or more processors; and
    one or more memories including computer program code, the one or more memories and the computer program code configured to, with the one or more processors, cause the magnetic positioning management apparatus at least to:
        assign an identifier for a transmitting mobile apparatus;
        command the transmitting mobile apparatus to transmit a radio beacon including the identifier;
        receive reception information from a receiving mobile apparatus that received the radio beacon, the reception information including the identifier of the transmitting mobile apparatus and indicating that routes of the transmitting mobile apparatus and the receiving mobile apparatus passed each other; and
        for both the transmitting mobile apparatus and the receiving mobile apparatus, determine its estimated location to improve a magnetic positioning based on an association of the transmitting mobile apparatus with the receiving mobile apparatus so that a location probability of the transmitting mobile apparatus and a location probability of the receiving mobile apparatus are processed in order to generate the estimated location.

2. The magnetic positioning management apparatus of claim 1, wherein the estimated location is determined based also on contents of radio signals received by at least one of the transmitting mobile apparatus or the receiving mobile apparatus.

3. The magnetic positioning management apparatus of claim 1, wherein the estimated location is determined based also on contents of indoor base station signals received by at least one of the transmitting mobile apparatus or the receiving mobile apparatus.

4. The magnetic positioning management apparatus of claim 1, wherein the estimated location is determined based also on contents of wireless local area network signals received by at least one of the transmitting mobile apparatus or the receiving mobile apparatus.

5. The magnetic positioning management apparatus of claim 1, wherein the estimated location is determined based also on contents of short-range radio signals received by at least one of the transmitting mobile apparatus or the receiving mobile apparatus.

6. The magnetic positioning management apparatus of claim 1, wherein the estimated location is determined based also on contents of Bluetooth radio signals received by at least one of the transmitting mobile apparatus or the receiving mobile apparatus.

7. The magnetic positioning management apparatus of claim 1, wherein the reception information further includes information on characteristics of radio reception of the radio beacon, and, in order to determine the estimated location, the characteristics of the radio reception of the radio beacon are taken into account.

8. The magnetic positioning management apparatus of claim 1, wherein the reception information further includes an estimated distance between the transmitting mobile station and the receiving mobile station, and, in order to determine the estimated location, the estimated distance is taken into account.

9. The magnetic positioning management apparatus of claim 1, wherein an Earth's magnetic field EMF map of a building is used by the magnetic positioning, and the EMF map for the building is chosen from among a plurality of EMF maps for a plurality of buildings for use by the magnetic positioning based on the estimated location.

10. The magnetic positioning management apparatus of claim 1, wherein an Earth's magnetic field EMF map of a building is used by the magnetic positioning, and a part of the EMF map of the building is chosen for use by the magnetic positioning based on the estimated location.

11. The magnetic positioning management apparatus of claim 1, wherein an Earth's magnetic field EMF map of a building is used by the magnetic positioning, and new EMF map data is received from one of the transmitting mobile apparatus or the receiving mobile apparatus, and the EMF map of the building is improved based on the new EMF map data.

12. The magnetic positioning management apparatus of claim 1, wherein, for the determination of the estimated location, history information comprising at least one of a past sensor event of the transmitting mobile apparatus, a past location of the transmitting apparatus, a past sensor event of the receiving mobile apparatus, a past location of the receiving mobile apparatus is taken into account.

13. The magnetic positioning management apparatus of claim 1, wherein, for the determination of the estimated location, reliability information comprising at least one of a reliability of the transmitting mobile apparatus, a reliability of the receiving mobile apparatus is taken into account.

14. The magnetic positioning management apparatus of claim 1, wherein, for the determination of the estimated location, co-operation information comprising at least one of data relating to another mobile apparatus communicating another radio beacon with the transmitting mobile apparatus, data relating to another mobile apparatus communicating another radio beacon with the receiving mobile apparatus is taken into account.

15. The magnetic positioning management apparatus of claim 1, wherein a probabilistic location is obtained for one of the transmitting mobile apparatus or the receiving mobile apparatus, whose indoor location is known, and for one of the transmitting mobile apparatus or the receiving mobile apparatus, whose indoor location is not known, its estimated location is determined based also on the probabilistic location.

16. The magnetic positioning management apparatus of claim 15, wherein the probabilistic location is obtained for the transmitting mobile apparatus, and the estimated location is determined for the receiving mobile apparatus based on the probabilistic location.

17. The magnetic positioning management apparatus of claim 16, wherein the reception information is received from a plurality of the receiving mobile apparatuses, and a plurality of the estimated locations are determined for the plurality of the receiving mobile apparatuses based on the probabilistic location.

18. The magnetic positioning management apparatus of claim 15, wherein the probabilistic location is obtained for the receiving mobile apparatus, and the estimated location is determined for the transmitting mobile apparatus based on the probabilistic location.

19. The magnetic positioning management apparatus of claim 18, wherein the reception information is received from a plurality of the receiving mobile apparatuses, a plurality of the probabilistic locations are obtained for the plurality of the receiving mobile apparatuses, and the estimated location is determined for the transmitting mobile apparatus based on the plurality of the probabilistic locations of the plurality of the receiving mobile apparatuses.

20. A non-transitory computer-readable storage medium comprising a computer program comprising computer program code which, when loaded into a magnetic positioning management apparatus causes the magnetic positioning management apparatus at least to:

assign an identifier for a transmitting mobile apparatus;
command the transmitting mobile apparatus to transmit a radio beacon including the identifier;
receive reception information from a receiving mobile apparatus that received the radio beacon, the reception information including the identifier of the transmitting mobile apparatus and indicating that routes of the transmitting mobile apparatus and the receiving mobile apparatus passed each other; and
for both the transmitting mobile apparatus and the receiving mobile apparatus, determine its estimated location to improve a magnetic positioning based on an association of the transmitting mobile apparatus with the receiving mobile apparatus so that a location probability of the transmitting mobile apparatus and a location probability of the receiving mobile apparatus are processed in order to generate the estimated location.

21. A method in a magnetic positioning management apparatus comprising:

assigning an identifier for a transmitting mobile apparatus; commanding the transmitting mobile apparatus to transmit a radio beacon including the identifier;
receiving reception information from a receiving mobile apparatus that received the radio beacon, the reception information including the identifier of the transmitting mobile apparatus and indicating that routes of the transmitting mobile apparatus and the receiving mobile apparatus passed each other; and
for both the transmitting mobile apparatus and the receiving mobile apparatus, determining its estimated location to improve a magnetic positioning based on an association of the transmitting mobile apparatus with the receiving mobile apparatus so that a location probability of the transmitting mobile apparatus and a location probability of the receiving mobile apparatus are processed in order to generate the estimated location.

* * * * *